Dec. 7, 1943.   W. H. EMERSON   2,335,925
APPARATUS FOR FEEDING PLASTIC MATERIAL
Filed May 9, 1940
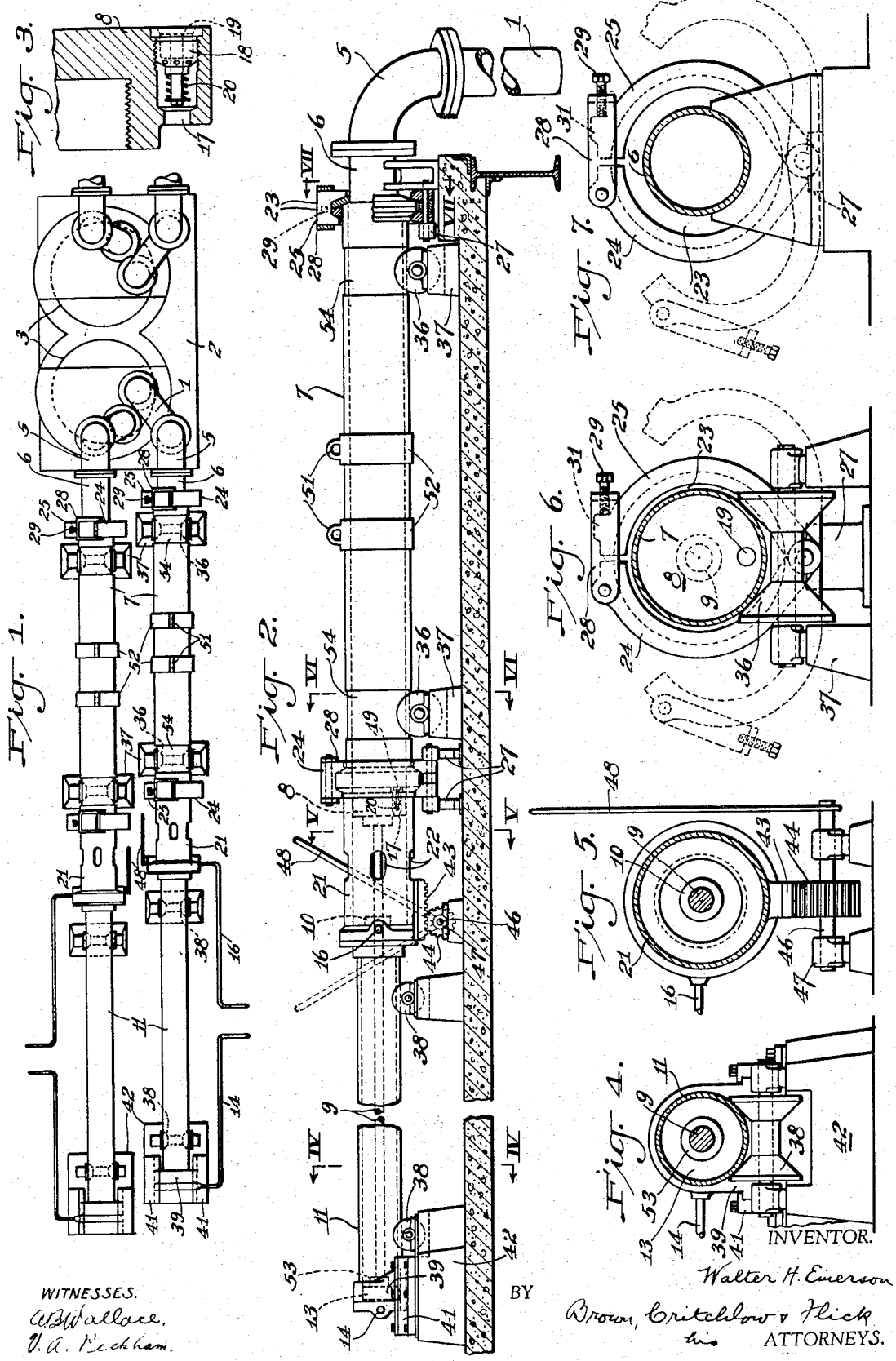
INVENTOR.
Walter H. Emerson
BY Brown, Critchlow & Flick
his ATTORNEYS.

Patented Dec. 7, 1943

2,335,925

UNITED STATES PATENT OFFICE 2,335,925

APPARATUS FOR FEEDING PLASTIC MATERIAL

Walter H. Emerson, East Liverpool, Ohio, assignor to The Homer Laughlin China Company, Newell, W. Va., a corporation of Delaware Application May 9, 1940, Serial No. 334,211

20 Claims. (Cl. 25—1)

This invention relates to the feeding of plastic material to locations at which it is used to form articles such as pottery or dishes, and is particularly applicable to the feeding of clay to automatic jiggering machines.

In manufacturing dinnerware, for example, it is common practice to make each article from a chunk of clay cut from a clay roll several inches in diameter and a couple of feet long. These rolls are formed by extrusion from pug mills fed by leaves of clay taken from filter presses. The rolls issuing from the pug mills are loaded on carts or conveyors by which they are transferred to the locations or stations where they are to be used. Whether the clay is to be used by jiggermen or by jiggering machines, it has been the practice heretofore to place each roll in the necessary location and to replace it by another roll as soon as it has been consumed. As only rather small rolls can be handled in this way, it requires a number of workmen to keep the stations supplied with clay. Furthermore, certain automatic apparatus, such as that shown in my copending application Serial No. 328,638, filed April 9, 1940, for forming dinnerware and the like necessitates the feeding of clay to it continuously from above at a uniform rate of speed. Before the advent of this invention there was no means for feeding the clay in such a manner. The high cost of pug mills makes it very expensive to provide a separate mill for each machine, and besides, such mills do not feed the clay at a uniform rate. Another difficulty experienced heretofore has been the warpage of the ware when it is dried, due to the relatively high moisture content in the clay that has been necessary in order to obtain the required plasticity.

It is among the objects of this invention to provide apparatus which feeds plastic material downwardly to a station, which feeds the material at a uniform rate continuously, which needs no attention while in operation, which can be readily refilled after it has been emptied, and which requires only one pug mill and a couple of workmen to keep a large number of units of this type of apparatus supplied with the plastic material. Other objects are to provide a method and apparatus for handling clay which permits the use of clay of relatively low moisture content.

In accordance with this invention a conduit which is adapted to conduct plastic material downwardly to a given location has a laterally extending upper end. A plunger, slidably mounted in a tubular housing, is spaced from the upper end of the conduit in alignment therewith. Removably mounted between the housing and the conduit is a tubular magazine adapted to be filled with the plastic material that is to be extruded from the lower end of the conduit when the plunger is forced through the magazine. The plunger is preferably driven forward at a uniform speed by a piston disposed in an hydraulic cylinder connected to the rear end of the plunger housing. To permit the magazine to be readily attached to and detached from the plunger housing and conduit so that it can be refilled with plastic material after it has been emptied, the adjoining ends of the magazine, housing, and conduit are preferably provided with flanges that are normally clamped tightly together by quickly detachable clamps. In addition, the hydraulic cylinder, housing, and magazine are all mounted for axial movement so that the magazine can be backed away from the conduit, and the housing then backed away from the magazine in order to facilitate removal of the latter from between the housing and conduit. The high pressure required to extrude the plastic material from the magazine and conduit increases the plasticity of the material and thereby permits material of lower moisture content to be used than could have been used heretofore.

The preferred embodiment of the invention is illustrated in the accompanying drawing in which Fig. 1 is a plan view of a pair of my apparatus disposed side by side above an automatic jiggering machine to which they are adapted to feed clay; Fig. 2 is an enlarged side view of the feeding apparatus; Fig. 3 is a still further enlarged fragmentary vertical section through the lower central half of the extruding plunger; and Figs. 4 to 7 are vertical sections taken on the lines IV—IV to VII—VII, respectively, of Fig. 2.

Referring to Figs. 1 and 2 of the drawing, a generally vertical tube 1 is mounted with its lower end spaced a short distance above one of the stations of an automatic jiggering machine 2 such as shown in my previously mentioned copending application Serial No. 328,638. To this station the rotatable table 3 of the machine indexes a mold that it carries so that it can receive a disc of clay cut from the lower end of a column of clay that is moved downwardly through the tube in a manner to be described presently. It will be understood that the clay is prepared in the usual way by mixing ceramic material with water to make a slip, screening and otherwise cleaning the slip, and then filtering out a large percentage of the water to produce clay of the desired plasticity.

The upper end of the tube is connected by an elbow 5 to a short horizontal adapter tube 6 supported by the floor above the machine. Connected to the upper end of the conduit thus formed is a horizontal tubular magazine 7 disposed in axial alignment with the adapter tube. This magazine is adapted to be filled with the clay that is fed to the conduit by a plunger 8 (Fig. 2) that travels through the magazine. Although this plunger may be forced through the magazine by mechanical or fluid pressure, it is preferred to do it in the latter way by hydraulic pressure. Accordingly, the plunger is mounted on the front end of a rod 9 that is slidably mounted in a packing gland 10 (Fig. 5) in the front end of an hydraulic cylinder 11. The rear end of the rod carries a piston 13 (Fig. 4) that is moved forward by liquid under pressure, such as oil, which is introduced into the rear end of the cylinder through a pipe 14. A pipe 16 connected to the front end of the cylinder permits fluid under pressure to be introduced therein for retracting the piston. These two pipes are controlled by suitable valves (not shown) and the oil is delivered to the cylinder preferably in the manner shown in the copending joint application of William C. Denison, Jr., and Walter H. Emerson, Serial No. 323,166, filed March 9, 1940, so that the plunger will be moved ahead at a uniform rate of speed regardless of the variations in resistance which the clay may offer. Consequently, the clay is extruded from the lower end of the conduit at a constant rate.

As shown in Figs. 3 and 6, the lower part of the plunger is provided with an axial passage 17 in which a sleeve 18 is screwed. The outer end of this sleeve forms a seat for a valve 19 that is biased toward it by a coil spring 20 encircling the valve stem behind the sleeve. While the plunger is being pulled back through the magazine after forcing the clay therefrom, the partial vacuum that tends to form between the plunger and the rear end of the clay column opens valve 19 to admit air instead of drawing some of the clay back into the magazine.

Secured to the front end of the cylinder between it and the rear end of the magazine there is a tubular member 21 that houses and supports the plunger when it is withdrawn entirely from the magazine. This housing is provided with openings 22 behind the plunger so that air can freely enter into and leave the housing as the plunger is reciprocated.

A feature of this invention is that the adjoining ends of the plunger housing, magazine and conduit are detachably connected together in such a manner that the magazine can be quickly and easily removed for recharging after it has been emptied by the plunger. Accordingly, the above-mentioned adjoining ends are provided with abutting flanges 23 which are normally connected together by clamping members. As shown in Figs. 6 and 7, each clamp is made in two arcuate halves 24 and 25 that are hinged together at their lower ends in a support 27 disposed below the magazine. The upper end of jaw 24 of each clamp carries a bifurcated arm 28 the divided ends of which are pivoted to the sides of the jaw. When the clamp is closed, arm 28 is swung over the opposite jaw 25, and a screw 29 carried by that end of the arm is tightened against the vertical face of a lug 31 integrally mounted on the upper end of jaw 25. This draws the two free ends of the clamp toward each other. Preferably, as shown at the right-hand end of Fig. 2, the outer faces of each pair of adjoining flanges converge outwardly and the associated clamp is provided with a recess in its inner surface having complementary converging side walls for receiving the flanges. Consequently, as the clamp is tightened in place, it draws the two flanges tightly together.

In order to permit the magazine and plunger housing to move axially so that the flanges can be clamped tightly together, and also so that adjoining flanges can be separated axially to allow the magazine to be easily removed, the magazine is mounted on a pair of concave rollers 36 journaled on pedestals 37 below it, and the hydraulic cylinder is similarly mounted on another pair of concave rollers 38. The rear end of the cylinder is carried by a flat-bottom guide shoe 39 that has laterally projecting portions which are slidable longitudinally in guide slots formed in a guide member 41 mounted on a supporting block 42. This construction prevents the cylinder from turning on its axis on its supporting concave rollers. To permit the plunger housing and cylinder to be moved backwardly away from the magazine, a rack bar 43 is mounted on the bottom of the housing where it meshes with a gear 44 rigidly mounted on a shaft 46 (Fig. 5) journaled in bearings 47 below the housing. The gear is rotated manually by an upwardly extending lever 48 rigidly connected at its lower end to the shaft.

In operation, fluid under pressure is supplied to the rear end of cylinder 11 through pipe 14, and pressure is released from the front of the cylinder through pipe 16. This drives piston 13 ahead and thereby forces plunger 8 slowly through magazine 7 which previously has been filled with clay. The clay is then forced out of the magazine and into the conduit by which it is led downwardly to the jiggering machine 2. As soon as the magazine has been emptied fluid pressure is introduced into the front end of the hydraulic cylinder and released from its rear end so that the movement of the piston will be reversed and the plunger withdrawn from the magazine and into the front portion of housing 21.

Screw 29 of the clamp at the conduit end of the magazine is then loosened so that arm 28 can be swung upwardly away from lug 31, and the two jaws of the clamp swung outwardly to their dotted line positions in Fig. 7. Lever 48 can now be swung back toward its dotted line position in order to move the cylinder, housing and magazine axially away from adapter tube 6. This movement separates flanges 23 at that end of the magazine and is absolutely necessary when the ends of the magazine and the adjoining tubular members are provided with male and female joints as is preferred. The ends of the magazine are provided with the male portions of the joints so that the clay can be more readily cleaned off.

After the magazine has been retracted as just described, the clamp at its plunger housing end is opened and lever 48 is then swung still farther back to pull the housing away from the magazine. This leaves the magazine entirely free and ready to be picked up by hooks suspended from an overhead monorail or the like and which can be inserted in eyes 51 in the upper ends of metal bands 52 encircling the central portion of the magazine. When lifted off rollers 36, the magazine can be transported to a pug mill to the outlet end of which it can be connected in order to be recharged with clay. The refilled magazine is returned to rollers 36 and clamped in place by just reversing the order of movements described above.

The forward movement of plunger 8 is stopped a few inches before it reaches the front end of the magazine, whereby a few inches of clay are left projecting from tube 6 into the magazine. This stopping of the plunger may be accomplished in several ways, Fig. 2 showing a collar 53 on the rear end of rod 9 which strikes the front end of the hydraulic cylinder. The reason that it is desirable to leave clay projecting from tube 6 is that some of the moisture in that particular portion of clay which engages the plunger is squeezed out and back around the plunger. This clay, being drier than the clay in the new magazine, would not weld satisfactorily to the new clay. Therefore, this projecting short length of drier clay is cut off just before the new magazine of clay is clamped in place.

When this clay feeding apparatus is used with the above-mentioned jiggering machine 2 which is provided with two clay receiving stations, it is preferred to use two units of such apparatus disposed side by side in pairs as shown in Fig. 1. The two units are substantially identical, but one operates while the exhausted clay magazine of the other is being refilled. This permits the clay to be fed continuously to the machine. Where one pug mill is serving several of these units, it is desirable that the magazines be interchangeable so that a magazine will not have to necessarily be returned to the same unit every time. Therefore, to assure that each magazine will be axially aligned with the associated plunger housing and conduit of any unit, all supporting rollers 36 are machined to exactly the same diameter and the roller engaging portions 54 of all of the magazines are machined to exactly the same radius.

With apparatus of this character it will be seen that each unit requires attention only when it is necessary to supply it with a new magazine of clay, and that this does not happen very often. Consequently, one workman can take care of a considerable number of units, and only one pug mill is necessary for a large number because several magazines can be filled by it while one is being emptied in the feeding apparatus. As the clay is completely enclosed in metal from the time it leaves the pug mill, it does not lose its moisture and become crusty. This apparatus thus makes it possible for the first time to supply heated clay to molds. By sealing the ends of a filled magazine with detachable caps, it can be stored for a long time without the clay therein losing its moisture. Due to the way the magazine is connected to the conduit and plunger housing, and to the provision for axial movement of all of the tubular members except the conduit, the portion of the apparatus that is under very high pressure during feeding is all in tension so that tie rods or a frame for the apparatus are unnecessary.

Another feature of this invention is that the high pressure (exceeding 100 pounds per square inch) required to force the clay out of the magazine and extrude it from tube 1, both of which are relatively long in comparison with their diameters, materially increases the plasticity of the clay. This high pressure gives the clay a uniform consistency not imparted to it by the lower pressures of the pug mill, evidently by placing in solution the air remaining in the clay and thereby wetting the very fine ceramic particles and eliminating air pockets. The increase in clay plasticity by this pressure method is very important, because it means that the clay that is jiggered has the usual degree of plasticity but contains a less amount of moisture than heretofore. For example, prior to my invention clay having a moisture content of about 22 per cent was considered to have about the right degree of plasticity for satisfactory working into dinnerware, but with my invention I can produce clay having the same plasticity by subjecting to high pressure clay that has a moisture content of only about 19 per cent. In fact, such clay is more uniformly plastic than that used heretofore, and is therefore more workable and requires less water during the jiggering operation. Due to less added water and to its lower moisture content, the ware made from this clay does not warp when dried because there is but little shrinkage. Consequently, denser and more perfect ware can be produced.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. Apparatus for feeding plastic material to a ware-forming station, comprising a conduit mounted in fixed position and leading to said station, a plunger spaced from the conduit in alignment with its inlet end, a tubular housing for the plunger, means mounted in fixed position relative to the conduit for maintaining the housing in definite predetermined relation to the conduit at all times, a tubular magazine for plastic material removably mounted between said housing and conduit and adapted to receive the plunger, and means for moving the plunger through the magazine to thereby force said plastic material out through said conduit, said apparatus requiring removal of said magazine for refilling.

2. Apparatus for feeding plastic material to a ware-forming station, comprising a conduit member mounted in fixed position and leading to said station, a plunger spaced from the conduit in alignment with its inlet end, a tubular housing member for the plunger, the housing being movable only axially toward and away from the conduit, a tubular magazine for plastic material removably mounted between said housing and conduit and adapted to receive the plunger, means for detachably locking the magazine to the adjacent end of at least one of said members, and means for moving the plunger through the magazine to thereby force said plastic material out through said conduit, said apparatus requiring removal of said magazine for refilling.

3. Apparatus for feeding plastic material to a ware-forming station, comprising a conduit mounted in fixed position and leading to said station, a plunger spaced from the conduit in alignment with its inlet end, a tubular housing for the plunger, means at all times maintaining said housing in coaxial relation to said conduit inlet, means for moving the housing and plunger axially in unison toward and away from the conduit, a tubular magazine for plastic material removably mounted between said housing and conduit and adapted to receive the plunger, means supporting the magazine for axial movement when said housing and plunger are retracted, means for detachably locking the magazine to the adjacent ends of the housing and conduit, and means for moving the plunger through the magazine to thereby force said plastic material out through said conduit, said apparatus requiring removal of said magazine for refilling.

4. Apparatus for feeding plastic material to a ware-forming station, comprising a conduit mounted in fixed position and leading to said station, a cylinder spaced from the conduit in alignment with its inlet end, a piston in the cylinder, a rod connected to the piston and projecting from an end of the cylinder toward said conduit, a plunger on the outer end of the rod, means mounted in fixed position relative to the conduit for maintaining the cylinder in definite predetermined relation to the conduit at all times, a tubular magazine for plastic material removably mounted between said cylinder and conduit in axial alignment with said plunger, means for detachably connecting the magazine to the cylinder and conduit, and means for introducing fluid under pressure to said cylinder to cause the piston to move the plunger through the magazine and thereby force said plastic material out through said conduit, said apparatus requiring removal of said magazine for refilling.

5. Apparatus for feeding plastic material to a ware-forming station, comprising a conduit mounted in fixed position and leading to said station, a cylinder spaced from the conduit in alignment with its inlet end, rotatable means supporting the cylinder for axial movement toward and away from the conduit, means for moving the cylinder only axially on said rotatable means, a piston in the cylinder, a rod connected to the piston and projecting from an end of the cylinder toward said conduit, a plunger on the outer end of the rod, a tubular magazine for plastic material removably mounted between said cylinder and conduit in axial alignment with said plunger, means for detachably connecting the magazine to the cylinder and conduit, and means for introducing fluid under pressure to said cylinder to cause the piston to move the plunger through the magazine and thereby force said plastic material out through said conduit, said apparatus requiring removal of said magazine for refilling.

6. Apparatus for feeding plastic material to a ware-forming station, comprising a conduit mounted in fixed position and leading to said station, a cylinder spaced from the conduit in permanent alignment with its inlet end, means for moving the cylinder axially toward and away from the conduit, a piston in the cylinder, a rod connected to the piston and projecting from an end of the cylinder toward said conduit, a plunger on the outer end of the rod, a tubular magazine for plastic material removably mounted between said cylinder and conduit in axial alignment with said plunger, means supporting the magazine for axial movement when said cylinder is retracted, means for detachably connecting the magazine to the cylinder and conduit, and means for introducing fluid under pressure to said cylinder to cause the piston to move the plunger through the magazine and thereby force said plastic material out through said conduit, said apparatus requiring removal of said magazine for refilling.

7. Apparatus for feeding plastic material to a ware-forming station, comprising a conduit mounted in fixed position and leading to said station, a plunger spaced from the conduit in alignment with its inlet end, a tubular housing for the plunger, a tubular magazine for plastic material removably mounted between said housing and conduit in axial alignment with the plunger, the adjoining ends of said housing and magazine and conduit being provided with flanges, clamps for pressing the adjoining flanges together, means mounted in fixed position beside the ends of the magazine for supporting the clamp, and means for moving the plunger through the magazine to thereby force said plastic material out through said conduit, said apparatus requiring removal of said magazine for refilling.

8. Apparatus for feeding plastic material to a station, comprising a conduit leading to said station, a plunger spaced from the conduit in alignment with its inlet end, a tubular housing for the plunger, a tubular magazine for plastic material removably mounted between said housing and conduit in axial alignment with the plunger, the adjoining ends of said housing and magazine and conduit being provided with flanges, the outer faces of each pair of adjoining flanges converging outwardly, a pair of hinged clamping members pivoted at one end beside each pair of flanges and provided with recesses for receiving and pressing said flanges together, means for detachably connecting the free ends of each pair of clamping members, and means for moving the plunger through the magazine to thereby force said plastic material out through said conduit.

9. Apparatus for feeding plastic material to a station, comprising a conduit leading to said station, a plunger spaced from the conduit in alignment with its inlet end, a tubular housing for the plunger connected to said cylinder, a tubular magazine for plastic material removably mounted between said housing and conduit in axial alignment with the plunger, the adjoining ends of said housing and magazine and conduit being provided with flanges and male and female joints, means supporting the magazine for axial movement toward said conduit, means for moving said housing axially toward the magazine to connect said joints, clamps for pressing the adjoining flanges together, and means for moving the plunger through the magazine to thereby force said plastic material out through said conduit.

10. Apparatus for feeding plastic material to a station, comprising a conduit leading to said station, a plunger spaced from the conduit in alignment with its inlet end, a tubular housing for the plunger, means supporting the housing for axial movement toward and away from the conduit, means holding the housing against rotation, gear and rack means for moving the housing axially on said supporting means, a tubular magazine for plastic material removably mounted between said housing and conduit in axial alignment with said plunger, means for detachably connecting the magazine to the housing and conduit, and means for moving the plunger through the magazine to thereby force said plastic material out through said conduit.

11. Apparatus for feeding plastic material to a station, comprising a conduit leading to said station, a cylinder spaced from the conduit in alignment with its inlet end, a piston in the cylinder, a rod connected to the piston and projecting from an end of the cylinder toward said conduit, a plunger on the outer end of the rod, a tubular housing for said plunger connected to said cylinder, a tubular magazine for plastic material removably mounted between said housing and conduit in axial alignment with the plunger, rollers supporting the cylinder for axial movement, means holding the cylinder against rotation, a rack bar mounted on the bottom of said housing longitudinally thereof, a gear pivotally mounted below said bar and meshing therewith, a lever connected to the gear for rotating it to move the cylinder and housing toward and away from said magazine, and means for introducing fluid under pressure to said cylinder to cause the piston to move the plunger through the magazine and thereby force said plastic material out through said conduit.

12. Apparatus for feeding plastic material to a ware-forming station, comprising a conduit leading to said station, a plunger spaced from the conduit in alignment with its inlet end, a tubular magazine for plastic material removably associated with the inlet end of said conduit and adapted to receive the plunger, means for moving the plunger through the magazine to thereby force said plastic material out through said conduit, said plunger being provided with a passage extending axially therethrough, and a valve in said passage adapted to be opened by the pressure differential on the two sides of the plunger as it is withdrawn whereby to prevent wtihdrawal of plastic material with it, said valve being flush with the surface of the plunger when closed.

13. Apparatus for feeding plastic material to a plurality of stations, comprising a separate conduit leading to each station, a plunger spaced laterally from each conduit in alignment with its inlet end, a substantially horizontal cylindrical magazine for plastic material having one end engaging the inlet end of each conduit and adapted to receive the associated plunger, a plurality of concave rollers of exactly the same diameters supporting the magazines with their axes extending transversely thereof whereby the magazines may be moved axially on their rollers when disengaged from said conduits, all of the roller-engaging portions of the magazines being machined to exactly the same radius to thereby allow said magazines to be interchangeable, and means for moving the plungers through the magazines to thereby force said plastic material out through said conduits.

14. Apparatus for feeding clay to a machine for making dinnerware, comprising a conduit mounted in fixed position and leading to said machine, a plunger spaced from the conduit in alignment with its inlet end, means at all times maintaining said plunger in coaxial relation to said conduit inlet, a tubular magazine for clay removably associated with the inlet end of said conduit and adapted to receive the plunger, and means for moving the plunger through the magazine to thereby force said clay out through said conduit, said apparatus requiring removal of said magazine for refilling.

15. Apparatus for feeding clay to a machine for making dinnerware, comprising a conduit mounted in fixed position and leading to said machine, a plunger spaced from the conduit in permanent alignment with its inlet end, a tubular magazine for clay removably associated with the inlet end of said conduit and adapted to receive the plunger, means for moving the plunger through the magazine to thereby force said clay out through said conduit, and means stopping the forward movement of the plunger before it reaches the outlet end of said magazine whereby to leave a short length of clay projecting from the inlet end of the conduit when the magazine is removed therefrom for refilling.

16. Apparatus for feeding plastic material to a ware-forming station, comprising a conduit leading to said station, a plunger spaced from the conduit in alignment with its inlet end, a tubular magazine for plastic material removably associated with the inlet end of said conduit and adapted to receive the plunger, and means for moving the plunger through the magazine to thereby force said plastic material out through said conduit, said magazine and conduit being of such form as to require an extrusion pressure by the plunger of more than one hundred pounds per square inch whereby the plasticity of the material extruded from the conduit is materially increased.

17. Apparatus for feeding plastic clay to a station, comprising a stationary conduit mounted in fixed position and leading to said station, a cylinder spaced from the conduit in alignment with its inlet end, a piston in the cylinder, a rod connected to the piston and projecting from an end of the cylinder towards said conduit, a plunger on the outer end of the rod, a tubular magazine for plastic material removably mounted between said cylinder and conduit in axial alignment with the plunger, rollers supporting the cylinder and magazine for axial movement, means for moving the cylinder toward and away from the conduit, and means for introducing fluid under pressure to said cylinder to cause the piston to move through the magazine and thereby force said plastic material out through said conduit.

18. Apparatus for feeding plastic material to a station, comprising a conduit mounted in fixed position and leading to said station, a plunger spaced from the conduit in alignment with its inlet end, a support for the plunger, rollers supporting said plunger support for axial movement toward and away from said conduit, a tubular magazine for plastic material removably mounted between said conduit and plunger-supporting means in axial alignment with the plunger, means for removably connecting the magazine to the conduit and plunger-supporting means, and means for moving the plunger through the magazine to thereby force said plastic material out through said conduit.

19. Apparatus for feeding plastic material to a ware-forming station, comprising a conduit mounted in fixed position and leading to said station, a plunger spaced from the conduit in alignment with its inlet end, a plurality of cylindrical magazines for plastic material each having one end adapted to engage the inlet end of said conduit and when in that position to receive said plunger, a plurality of concave rollers of like diameter for supporting one of said magazines when it is in said position whereby the magazine may be moved axially when disengaged from the conduit, all of the roller-engaging portions of the magazines being of the same radius to thereby allow the magazines to be interchangeable, and means for moving the plunger through the magazine associated therewith to thereby force said plastic material out through said conduit.

20. Apparatus for feeding clay to a mold-charging station in the manufacture of dinnerware, comprising a conduit mounted in fixed position and leading to said station, a plunger spaced from the conduit in alignment with its inlet end, means at all times maintaining said plunger in coaxial relation to said conduit inlet, a tubular magazine for clay removably associated with the inlet end of said conduit and adapted to receive the plunger, and means for moving the plunger through the magazine to thereby force said clay out through said conduit, said apparatus requiring removal of said magazine for refilling.

WALTER H. EMERSON.